United States Patent
Highgate et al.

(10) Patent No.: US 8,945,430 B2
(45) Date of Patent: Feb. 3, 2015

(54) PHOTOVOLTAIC CELL CONTAINING A POLYMER ELECTROLYTE

(71) Applicant: ITM Power (Research) Limited, South Yorkshire (GB)

(72) Inventors: Donald James Highgate, Surrey (GB); Nicholas Baynes, Sheffield (GB); Rachel Louise Smith, Sheffield (GB); Kris Hyde, Sheffield (GB)

(73) Assignee: ITM Power (Research) Ltd., South Yorkshire (GB)

( * ) Notice: Subject to any disclaimer, the term of this patent is extended or adjusted under 35 U.S.C. 154(b) by 85 days.

(21) Appl. No.: 13/918,162

(22) Filed: Jun. 14, 2013

(65) Prior Publication Data

US 2013/0280845 A1      Oct. 24, 2013

Related U.S. Application Data

(63) Continuation of application No. 12/769,947, filed on Apr. 29, 2010, now abandoned.

(51) Int. Cl.
*H01G 9/00* (2006.01)
*H01G 9/20* (2006.01)

(52) U.S. Cl.
CPC ........... *H01G 9/0029* (2013.01); *H01G 9/2009* (2013.01); *H01G 9/2031* (2013.01); *H01G 9/2059* (2013.01); *Y02E 10/542* (2013.01)

USPC .......... 252/501.1; 252/500; 438/57; 136/263; 136/252

(58) Field of Classification Search
CPC ..................................................... H01G 9/0029
USPC ........... 252/501.1, 500; 438/57; 136/263, 252
See application file for complete search history.

(56) References Cited

U.S. PATENT DOCUMENTS

| | | |
|---|---|---|
| 2003/0113603 A1 | 6/2003 | Highgate |
| 2008/0063920 A1 | 3/2008 | Highgate et al. |
| 2010/0173070 A1 | 7/2010 | Niu |
| 2011/0088757 A1* | 4/2011 | Highgate et al. ............... 136/252 |
| 2011/0217544 A1 | 9/2011 | Young et al. |
| 2011/0265862 A1* | 11/2011 | Highgate et al. ............... 136/252 |

FOREIGN PATENT DOCUMENTS

| | | |
|---|---|---|
| GB | 2467116 A | 7/2010 |
| WO | WO 03/023890 A2 | 3/2003 |
| WO | WO 2005/020332 A2 | 3/2005 |
| WO | WO 2005/124915 A1 | 12/2005 |
| WO | WO 2010/022353 A1 | 2/2010 |

* cited by examiner

*Primary Examiner* — Douglas McGinty
(74) *Attorney, Agent, or Firm* — Saliwanchik, Lloyd & Eisenschenk

(57) ABSTRACT

A photovoltaic cell comprises a membrane electrode assembly obtainable by the in situ polymerization between two electrodes of one or more monomers to form a polymer, and then infusing an activating agent into the polymer, wherein the activating agent enables the membrane electrode assembly to function as a photovoltaic cell.

17 Claims, No Drawings

PHOTOVOLTAIC CELL CONTAINING A POLYMER ELECTROLYTE

CROSS-REFERENCE TO A RELATED APPLICATION

This application is a continuation application of application Ser. No. 12/769,947, filed Apr. 29, 2010, now abandoned, which is incorporated herein by reference in its entirety.

FIELD OF THE INVENTION

The present invention relates to membranes suitable for use in a photovoltaic cell, and to photovoltaic cells containing such membranes.

BACKGROUND OF THE INVENTION

A photovoltaic electrochemical cell converts light energy into electrical energy, the "photovoltaic effect" being the process through which light energy is converted into electrical energy. Photovoltaic cells are typically solid state devices, usually semiconductors such as silicon. Usually one or more photosensitive junctions are irradiated, simultaneously generating a voltage and a current.

A potentially lower cost alternative to the solid state devices are dye-sensitized cells. Dye-sensitized solar cells offer a promising route to low cost solar energy. A standard dye-sensitized cell uses a liquid electrolyte to complete the electrical circuit between the convoluted surface of the dye-sensitized electrode and the flat counter electrode. A liquid is normally necessary to fill all the microscopic voids in the dye-sensitized electrode and thereby provide an effective ion conduction path to each dye molecule, where the light is absorbed and energy converted into electronic form. However cells made with the conventional liquid electrolyte suffer from a risk of leakage, variable thickness and 'pooling' in flexible cells, and, in some formulations, loss of volatile components by diffusion and evaporation, all of which can be detrimental to the reliability and longevity of the cell.

WO03/023890 describes hydrophilic polymers for use in a membrane electrode assembly formed by an in situ polymerisation process. WO2005/020332 describes the use of these materials in photovoltaic electrochemical cells. This publication further describes a method of forming both MEAs and membranes having improved photovoltaic properties. The contents of both of these publications are incorporated herein by reference.

UK unpublished application number 0900568.7, incorporated herein by reference, describes the use of encapsulation methods as a route to incorporating components into membrane electrode assemblies (MEAs), when those components inhibit polymerisation. An example is to provide an iodide/tri-iodide system encapsulated for later release into a solid electrolyte to allow in situ curing of the MEA.

SUMMARY OF THE INVENTION

The present invention is a photovoltaic cell comprising a membrane electrode assembly obtainable by the in situ polymerisation between two electrodes of one or more monomers to form a polymer, and then infusing an activating agent into the polymer, wherein the activating agent enables the membrane electrode assembly to function as a photovoltaic cell.

DESCRIPTION OF PREFERRED EMBODIMENTS

As used herein, an activating agent is an agent which, when infused into the MEA, enables the membrane electrode assembly to function as a photovoltaic cell, i.e. enable the MEA to absorb light and convert in into energy.

Many of the components which are required to make a photovoltaic cell work are inhibitors of polymerisation. For example, in the case of a dye-sensitized solar cell (DSSC), a component required to make it work is iodide/tri-iodide. This is a redox couple needed to distribute electrons throughout the electrolyte.

The present invention includes many different embodiments. A redox mediator such as iodide could be polymerised with the monomer mixture, and then iodine could be diffused into the polymer, in order to form a redox couple (iodide/tri-iodide) and make the cell work. Alternatively, oxygen could be diffused into the polymer to the same effect, as could any oxidant.

Also, after polymerisation of the monomers, a redox mediator such as iodine could be diffused into the polymer to form a tri-iodide/iodine redox couple.

The use of hydrophilic polymers in conjunction with a conventional ionic-liquid based PV electrolyte enables the production of improved PV cells, made via the one-shot production process as described in WO03/023890. Additionally the use of hydrophilic ionic materials as described in WO03/023890 may give additional advantages. In either case, once this mixture is cured there are no volatile components, and the electrolyte is a solid, both important requirements for long term stability.

Solid hydrophilic electrolytes, particularly those as described in WO03/023890, are cured in situ from relatively low viscosity mixtures of monomers, into transparent solid electrolytes. These mixtures cure by a free-radical polymerization which can be initiated by gamma irradiation, thermal initiators or photo initiators. By incorporating suitable ionic moieties materials can be produced, which function as redox mediators in dye sensitised solar cells (DSSCs). As an example Grätzel DSSCs use an iodide/tri-iodide system, although the application is not limited to these chemistries. Before curing, the electrolyte monomer mixture has similar viscosity to that of standard DSSC electrolytes. Incorporation of suitable components may be by a variety of routes:

1. All electrolyte components cured in situ.
   a. As a homogenous mixture
   b. With one or more components encapsulated ready for later release
2. Infusing a liquid electrolyte or absorbing components into the cured polymer/ionomer.
3. Attaching the mediator strongly or loosely to the polymer/ionomer, either during or after curing.

The invention described herein is compatible with a range of dye stuffs and semiconductors as used by Grätzel, G24i and Dyesol.

Grätzel DSSCs contain both iodide ($I^-$) and tri-iodide ($I_3^-$). The tri-iodide is normally produced by adding iodine ($I_2$) to a solution containing iodide. Iodine and tri-iodide are inhibitors of free radical polymerization, the process by which ITM's class of hydrophilic ionic materials are cured. Therefore the iodide and tri-iodide cannot simply be added to the monomer mixture prior to curing. Suitable materials can be produced via two routes, an encapsulation method or via an oxidation process. This example details the oxidation process.

The oxidation process works by adding just iodide (for example in the form of potassium iodide) to a liquid acidic monomer mixture, tri-iodide is slowly generated by reaction with dissolved oxygen, which must diffuse in from the atmosphere.

The slowness of this reaction means that there is time for the mixture to be cured before significant tri-iodide is generated, and thus the problem of inhibition is solved.

When cured in situ (incorporating either the encapsulation or oxidation process to produce tri-iodide), the solid polymer electrolyte makes intimate contact with the surface of both electrodes: the dye-sensitized nanoporous semi conductor, and the catalyst-coated counter electrode.

Although free-radical polymerization can be initiated in a variety of ways, the use of an oxidation method of creating tri-iodide means it is necessary to cure as quickly as possible. A low rate of initiation would be unable to keep pace with generation of the tri-iodide inhibitor. Thus photo initiation is the preferred option.

For good longevity, the transparent top sheet of a DSSC is UV blocking. A cut-off of 400 nm blocks <5% of solar energy (about 7% of absorbable photons) but greatly enhances the stability of organic materials in the cell, particularly the dye and the electrolyte. However, because of this cut-off, many standard UV initiators and light sources are not suitable, the initiator needs to respond to visible light, Diphenyl (2,4,6-trimethlybenzoyl)-phosphine oxide (TPO) is a preferred initiator. Suitable lamps for curing include high pressure mercury discharge lamps with enhanced visible output such as UV00000489 bulb from Uvitron, or LED sources such as the Firefly from Phoseon.

EXAMPLE 1

8.38 g of 2-Acrylamido-2-methyl-1-propanesulfonic acid (AMPSA) was placed in a beaker with 4.20 g of deionised water and stirred for ten minutes at room temperature. This resulted in a white slurry. The beaker was transferred to an ice bath and after one minute 3.09 g of a 50% solution of NaOH in water was added drop-wise. This produced a transparent solution. The beaker was removed from the ice bath and the following ingredients added while stirring. 2.02 g of 2-hydroxyethyl methacrylate (HEMA), 0.60 g of TPO, 0.60 g of Allyl methacrylate (AM). After stirring for another 20 minutes a clear solution resulted. This mixture cures readily to an elastic solid in a few minutes with suitable visible light initiation. However, it does not yet contain any iodide. It should not be stored with iodide present as it will gradually oxidise to tri-iodide, making curing more difficult.

To produce a working dye-sensitized solar cell electrolyte an aqueous solution of potassium iodide is added immediately before curing. In this case, 0.32 g of a 50% aqueous solution of KI was added to 2 g of the monomer mixture. This was sealed in a plastic bag and placed under a curing lamp. A clear elastic solid was produced in 6 minutes. By the next day the solid polymer had turned brown due to the oxidation of iodide to tri-iodide by atmospheric oxygen. The final composition of the mixture just before curing is: 36% water, 9% HEMA, 1.6% AMPSA (acid form), 41% AMPSA sodium salt, 2.7% TPO, 2.7% AM, 7% KI.

The oxidation of the cured polymer may be achieved by a variety of means including the diffusion of atmospheric oxygen, ozone, DMSO or other oxidising agents.

EXAMPLE 2

The following materials were placed in an amber bottle with a magnetic stirrer bead. 0.268 g Li, 0.068 g guanidine thiocyanate, 0.097 g TPO, 0.258 AM, 0.767 g HEMA, 0.754 g Methylmethacrylate (MMA), 2.81 g 1-propyl-3-methylimidazolium iodide (PMII). After stirring for an hour at room temperature a clear solution was produced.

A drop of this monomer mixture was placed on a piece of titanium sheet 20 mm×10 mm covered with dye-sensitized nanoporous titania. A piece of transparent plastic 20 mm×6 mm coated with platinised transparent conductive oxide was placed on top of this so they overlapped by 9 mm. The monomer mixture was allowed to wick into the porous photo anode for a minute. The top sheet was gently pressed down with a fine metal tip which was left in place whilst the device was illuminated by a curing lamp (Uvitron Intelliray 400 with UV00000489 visible-enhanced bulb) for ten minutes. This cured the mixture to a solid polymer which adhered the two electrodes together. Two drops of acetone with 50 mM dissolved iodine were placed in a small glass bottle. This was allowed to dry for a minute, leaving about 0.2 mg of iodine residue. The PV device was sealed in this bottle and placed in a 60° C. oven for 18 hours to infuse.

This device was tested under a solar simulator producing an AM1.5 spectrum with intensity of 1000 W/m$^2$. The open circuit voltage was 0.50V, short circuit current density 89 A/m$^2$, peak power output was 22.6 W/m$^2$, indicating a fill factor of 51% and a power conversion efficiency of 2.26%.

EXAMPLE 3

The following materials were placed in an amber bottle with a magnetic stirrer bead. 0.11 g guanidine thiocyanate, 0.13 g TPO, 0.36 g Ethylene glycol dimethacrylate (EGDM), 1.70 g HEMA, 4.70 g PMII. After stirring for an hour at room temperature a clear solution was produced.

A drop of this monomer mixture was placed on a piece of titanium sheet 20 mm×10 mm covered with dye-sensitized nanoporous titania. A piece of transparent plastic 20 mm×6 mm coated with platinised transparent conductive oxide was placed on top of this so they overlapped by 8 mm. The monomer mixture was allowed to wick into the porous photo anode for a minute. The top sheet was gently pressed down with a fine metal tip which was left in place while the device was illuminated by a curing lamp (Uvitron Intelliray 400 with UV00000489 visible-enhanced bulb) for ten minutes. This cured the mixture to a solid polymer which adhered the two electrodes together. Two drops of acetone with 50 mM dissolved iodine were placed in a small glass bottle. This was allowed to dry for a minute, leaving about 0.2 mg of iodine residue. The PV device was sealed in this bottle and placed in a 60° C. oven for 18 hours to infuse.

This device was tested under a halogen lamp with illumination intensity roughly equivalent to a solar spectrum at 380 W/m$^2$. The open circuit voltage was 0.59V, short circuit current density 1.6 A/m$^2$, peak power output was 0.61 W/m$^2$, indicating a fill factor of 65% and a power conversion efficiency of 0.2%.

EXAMPLE 4

A mixture was made in an opaque bottle containing: 52.5% HEMA, 42.5% water, 5% ethylene glycol dimethacrylate and 1% TPO. A drop of this monomer mixture was placed on a piece of titanium sheet covered with dye-sensitized nanoporous titania. A piece of transparent plastic coated with platinised transparent conductive oxide was placed on top of this so they overlapped. The device was illuminated by a curing lamp (Uvitron Intelliray 400 with UV00000489 visible-enhanced bulb) for ten minutes.

The cured cells were placed in a container and covered in a commercially purchased DSSC liquid electrolyte. These were then placed in an oven at 90 C for 4 hours, allowing the electrolyte to diffuse into the polymer structure. These were then tested under a halogen bulb with illumination intensity roughly equivalent to a solar spectrum at 380 W/m². and produced a current density of 195 □A/cm².

EXAMPLE 5

The following materials were placed in an amber bottle with a magnetic stirrer bead. 0.019 g AM, 0.023 g TPO, 0.26 g HEMA, 0.46 g PMII, 0.015 g sodium dodecylsulphate, 0.15 g water. After stirring for an hour at room temperature a clear solution was produced.

A drop of this monomer mixture was placed on a piece of titanium sheet 20 mm×10 mm covered with dye-sensitized nanoporous titania. A piece of transparent plastic 20 mm×6 mm coated with platinised transparent conductive oxide was placed on top of this so they overlapped by 8 mm. The monomer mixture was allowed to wick into the porous photo anode for a minute. The device was illuminated by a curing lamp (Uvitron Intelliray 400 with UV00000489 visible-enhanced bulb) for ten minutes. This cured the mixture to a solid polymer which adhered the two electrodes together. Two drops of acetone with 50 mM dissolved iodine were placed in a small glass bottle. This was allowed to dry for a minute, leaving about 0.2 mg of iodine residue. The PV device was sealed in this bottle and placed in a 60° C. oven for 18 hours to infuse.

This device was tested under a halogen lamp with illumination intensity roughly equivalent to a solar spectrum at 380 W/m². The open circuit voltage was 0.49V, short circuit current density 5.4 A/m², peak power output was 1.7 W/m², indicating a fill factor of 64% and a power conversion efficiency of 0.45%.

We claim:

1. A method for forming a photovoltaic cell, comprising:
   polymerizing one or more monomers and one half of a redox couple between two electrodes in situ, to form a polymer membrane electrode assembly; and
   infusing an activating agent into the polymer, wherein the activating agent reacts with the one half of the redox couple to produce the other half of the redox couple, thereby enabling the membrane electrode assembly to function as a photovoltaic cell,
   wherein the one half of the redox couple is not an inhibitor of free radical polymerization, and wherein the other half of the redox couple is an inhibitor of free radical polymerization.

2. The method according to claim 1, wherein the membrane electrode assembly comprises a hydrophilic polymer.

3. The method according to claim 1, wherein the one half of the redox couple is added immediately prior to the polymerisation.

4. The method according to claim 1, wherein the activating agent is an oxidant or a reductant.

5. The method according to claim 1, wherein the activating agent is atmospheric oxygen.

6. The method according to claim 1, wherein the activating agent is hydrogen peroxide.

7. The method according to claim 1, wherein the activating agent is dimethyl sulfoxide (DMSO).

8. The method according to claim 1, wherein the activating agent is an electrolyte.

9. The method according to claim 8, wherein the electrolyte is a dye-sensitized solar cell electrolyte.

10. The method according to claim 1, wherein the activating agent is a redox mediator.

11. The method according to claim 1, wherein the one half of the redox couple is iodide.

12. The method according to claim 1, wherein the activating agent is iodine.

13. The method according to claim 1, wherein the other half of the redox couple is tri-iodide.

14. The method according to claim 1, wherein the one half of the redox couple is iodide and the other half of the redox couple is tri-iodide.

15. The method according to claim 1, wherein the one half of the redox couple is iodide and the other half of the redox couple is iodine.

16. The method according to claim 1, wherein one electrode is a dye-sensitised nanoporous semi-conductor and the other electrode is a catalyst-coated counter electrode.

17. The method according to claim 1, wherein the polymerisation is photo-initiated.

* * * * *